(No Model.)
G. H. CARVER.
HORSE HAY RAKE.
No. 473,496. Patented Apr. 26, 1892.
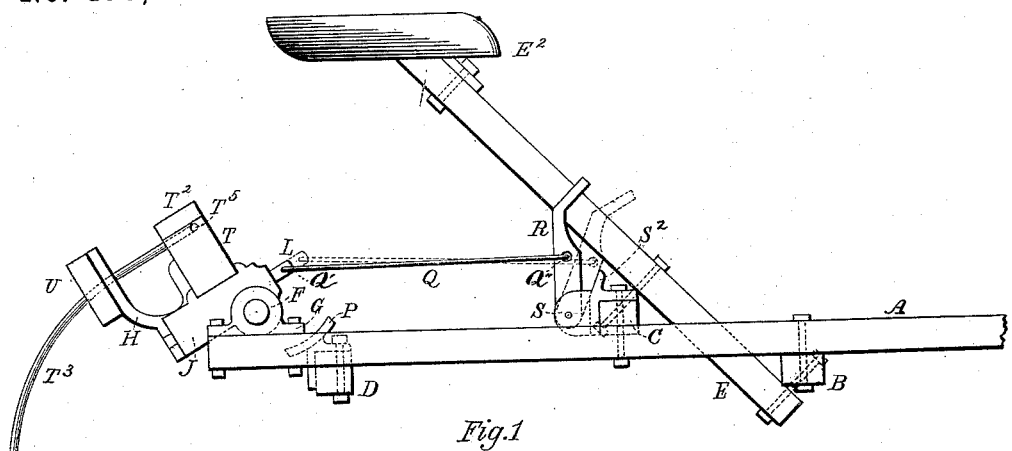
Fig. 1
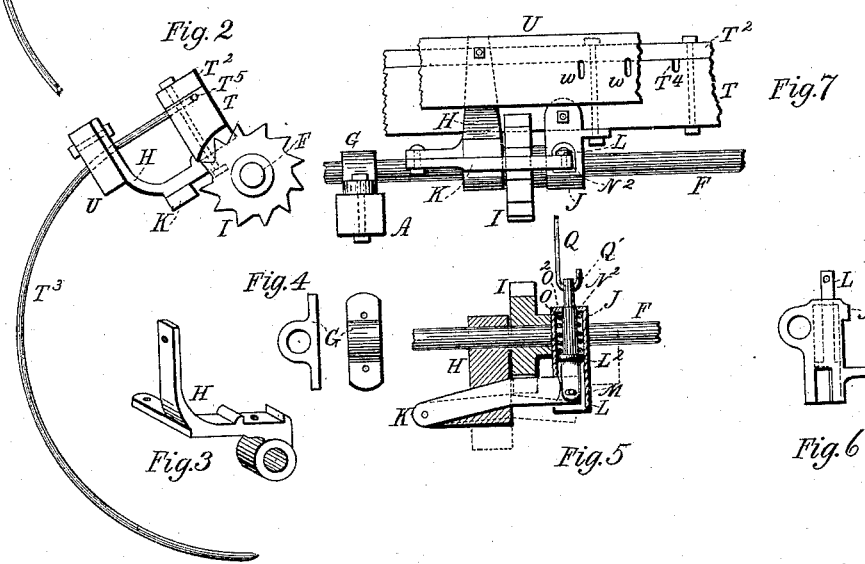
Fig. 2   Fig. 7
Fig. 3   Fig. 4   Fig. 5   Fig. 6
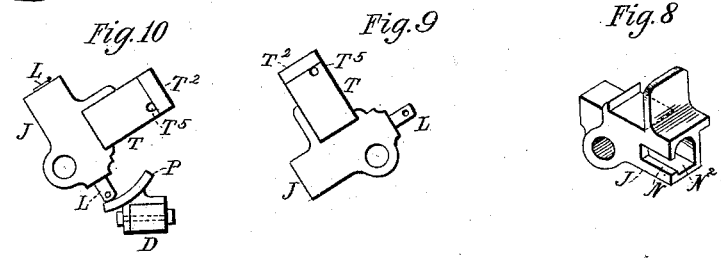
Fig. 10   Fig. 9   Fig. 8
Witnesses:
George G. Hunt
J. Taylor
Inventor,
George H. Carver

UNITED STATES PATENT OFFICE.

GEORGE H. CARVER, OF PLANO, ILLINOIS, ASSIGNOR TO THE PLANO MANUFACTURING COMPANY, OF SAME PLACE.

HORSE HAY-RAKE.

SPECIFICATION forming part of Letters Patent No. 473,496, dated April 26, 1892.

Application filed April 7, 1891. Serial No. 388,038. (No model.)

*To all whom it may concern:*

Be it known that I, GEORGE H. CARVER, residing at Plano, in the county of Kendall and State of Illinois, have invented certain new and useful Improvements in Horse Hay-Rakes, of which the following is a specification.

My invention relates to that class of hay-rakes in which the axle upon which the wheels are mounted extends the entire width of the machine and is so arranged as to rotate with the wheels during the forward motion thereof for the purpose of lifting the rake-head and dumping the load by the power of the horse through the traction of the wheels.

My improvement has for its object simplicity of construction, cheapness, durability, and ease of operation. I attain these objects by the mechanism illustrated in the accompanying drawings, in which—

Figure 1 is a side elevation of that part of a hay-rake to which my invention relates. Fig. 2 is a side view of the rake-head and its adjuncts in its normal position while raking, also of the toothed wheel fast to the axle. Fig. 3 is a perspective view of a casting, to which the rake-head and tooth-guide are attached and through the medium of which the rake-head and attachments oscillate upon the axle. Fig. 4 is a plan and side view of one of the boxes in which the axle revolves and by which the axle is connected to the framework of the machine. Fig. 5 is a top view, partly in section, of several parts of the clutching mechanism in their proper relative working position, which will hereinafter be more particularly referred to. Fig. 6 is a side view of the parts shown in Fig. 5. Fig. 7 is a rear view of the parts shown in plan in Fig. 5, with the addition of the rake-head, tooth-guides, and part of the frame-work of the machine. Fig. 8 is a perspective view of a casting, which I denominate a "clutch-bolt housing." Fig. 9 is a detached view of the clutch-bolt housing, with rake-head in normal position, and showing clutch-bolt drawn out so that the rake-head is ready to move forward about the axle. Fig. 10 is a view of the same part at the moment the load has been dumped and shows the clutch-bolt forced back by the action of the cam-plate P.

Similar letters refer to similar parts throughout the several views.

The frame-work of my horse-rake is not essentially different from those now in use. It consists of a pair of shafts, one of which is marked A, or, if preferred, a tongue may be used instead, which are bolted firmly to cross-pieces B, C, and D, as shown in Fig. 1. These cross-pieces are placed at such proper distances from an axle F, mounted in boxes G, attached to the frame, as to be convenient to attach other parts of the working mechanism. At each end of the axle a ground-wheel is mounted (not shown) and arranged in the ordinary manner by collars fast upon the axle and carrying spring-actuating dogs working into internal teeth in the hubs of the ground-wheels, so that as the wheels move forward the axle rotates with the wheels, but in backing the wheels rotate upon the axle.

Near the center of the axle is rigidly fastened a toothed wheel I. This wheel has upon one side a boss or collar for the purpose of giving a suitable bearing upon the axle. A pin may be placed through the collar and axle and riveted, or a key may be placed in ways cut in both wheel and axle.

Upon one side of the toothed wheel and in close proximity thereto is loosely mounted upon the axle a casting H, to which is bolted the rake-head T and rake-tooth guide U. The casting H is provided with a lateral projection, to which is attached one end of a vibratable latch K. Upon the opposite side of the toothed wheel and loosely mounted upon the axle is placed a casting J. (Shown in perspective in Fig. 8 and in section in Fig. 5.) This casting is formed with a hollow chamber $N^2$, Figs. 5 and 8, for the reception of a sliding bolt L. This bolt is provided with a collar $L^2$, against which a coiled spring O, which surrounds the bolt, presses. At its opposite end the spring presses against the internal flange $O^2$, thus forcing the bolt rearward until the hook Q' brings up against the end of the housing J. In this position the latch K, which is pivotally attached to the bolt L by the pin M, is in the rear of and out of engagement with the toothed wheel I, and the rake-head is in position for raking. The relative positions of the parts H, I, and J upon the axle are preserved by bolts which fasten the castings H and J to the rake-head. In Fig. 5 one end of the latch K is shown pivotally attached to the lateral projection on the part H. By referring to Fig. 7 it is seen that the opposite end of the latch lies within the slot N, Fig. 8, and also projects across the cavity $N^2$. This end of the latch is provided with a short slot, in which the pin M works. The pin is preferably rigidly attached in the bolt L and loosely to the latch K for convenience. The clutch-bolt L is connected by means of a rod Q, bent into hooks Q' and Q'' at the ends to a lever R. This lever is arranged such convenient distance as to be operated by the driver, who sits upon the seat $E^2$. In Fig. 1 the rake-head and attached parts are represented in proper position for raking. The same position of rake-head is also shown in Fig. 9. At the moment when the driver sees that he has a load or wishes to dump he places his foot against the lever R and forces it forward until it touches a stop $S^2$. The position then is shown by dotted lines. As the lever is pivotally attached at its lower end to the casting S, as shown, the forward movement of the lever draws the clutch-bolt L, through the medium of the rod Q, to the position shown in Fig. 5. As the bolt L is pin-jointed to the latch K, the latch also moves forward, and as the toothed wheel moves into a position to enable the latch to enter one of the openings between the teeth the different parts are clutched or locked together, and as the rake moves forward the rake-head and adjuncts move forward in a path concentric with the center of the axle. This movement continues until the forward end of the clutch-bolt enters the curved surface of the tripping-plate P. This plate P has its upward curved surface inclined to the path of the end of the bolt L, so that while the end of the bolt L freely enters the curve the further forward and downward movement of the rake-head and bolt L causes the bolt L to slide back in the housing, carrying with it the latch K out of its engagement with the toothed wheel I, when the rake-head by the force of gravity immediately returns to its normal position. A hand-lever to lift the rake-head while the machine is at rest is preferably attached to the machine.

The rake-head T is of the ordinary construction, having upon its rear upper edge a series of openings, one of which is marked $T^4$ in Fig. 7. These openings are at such a distance apart along the rake-head as it is desirable to separate the teeth of the rake—say four and one-half inches. The apertures $T^4$ extend forward across the rake-head until they connect with the longitudinal groove $T^5$, Figs. 1, 2, and 9. The rake-teeth, one of which is marked $T^3$, have bent ends. The bent ends of the teeth are placed in the groove $T^5$ in the rake-head, with the body part of the teeth in the openings $T^4$. A cap-piece extending the length of the rake-head is placed over the rake-teeth and firmly fastened by bolts to the rake-head, as shown in Fig. 2. A rake-tooth guide U, having a series of slotted holes $w\ w$, Fig. 7, through which the teeth pass, is also firmly attached to the part H, as shown in Fig. 2, thus forming a check to lateral movement of the teeth.

Having thus described my invention, what I claim as new, and desire to secure by Letters Patent, is—

1. The combination, in a hay-rake, of a frame-work having a rotatable wheel-axle mounted thereon and provided with a rigidly-attached toothed wheel I, a casting or part H, in close proximity to one side of said toothed wheel, a casting or part J, as described, in close proximity to the opposite side of said toothed wheel, a vibratable bar or latch pivoted at one end to the part H, a sliding bolt L, a draw-rod Q, and pivoted lever R, substantially as and for the purpose specified.

2. The combination, in a hay-rake, of a frame-work having a rotatable wheel-axle mounted thereon and provided with a rigidly-attached toothed wheel I, a casting or part H, in close proximity to one side of said toothed wheel, a casting or part J, as described, in close proximity to the opposite side of said toothed wheel, a vibratable bar or latch K, pivoted at one end to the part H, a sliding bolt L, provided with a shoulder $L^2$, a retracting-spring O, a draw-rod Q, and pivoted lever R, all substantially as set forth.

GEORGE H. CARVER.

Witnesses:
E. J. TAYLOR,
H. C. PATTERSON.